(No Model.) 2 Sheets—Sheet 1.
W. D. PENNOCK.
BEE HIVE.
No. 425,047. Patented Apr. 8, 1890.
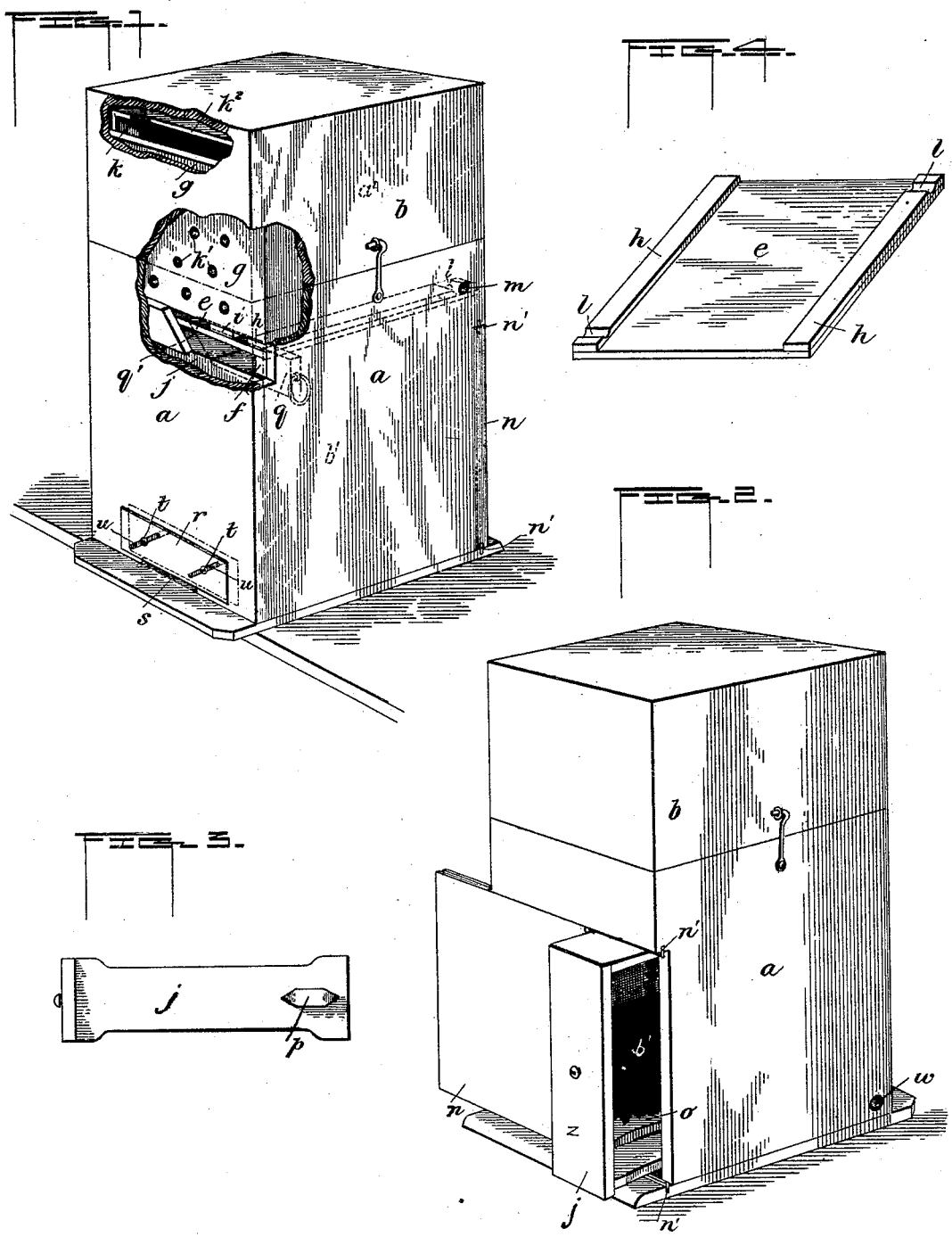

(No Model.) 2 Sheets—Sheet 2.
W. D. PENNOCK.
BEE HIVE.
No. 425,047. Patented Apr. 8, 1890.
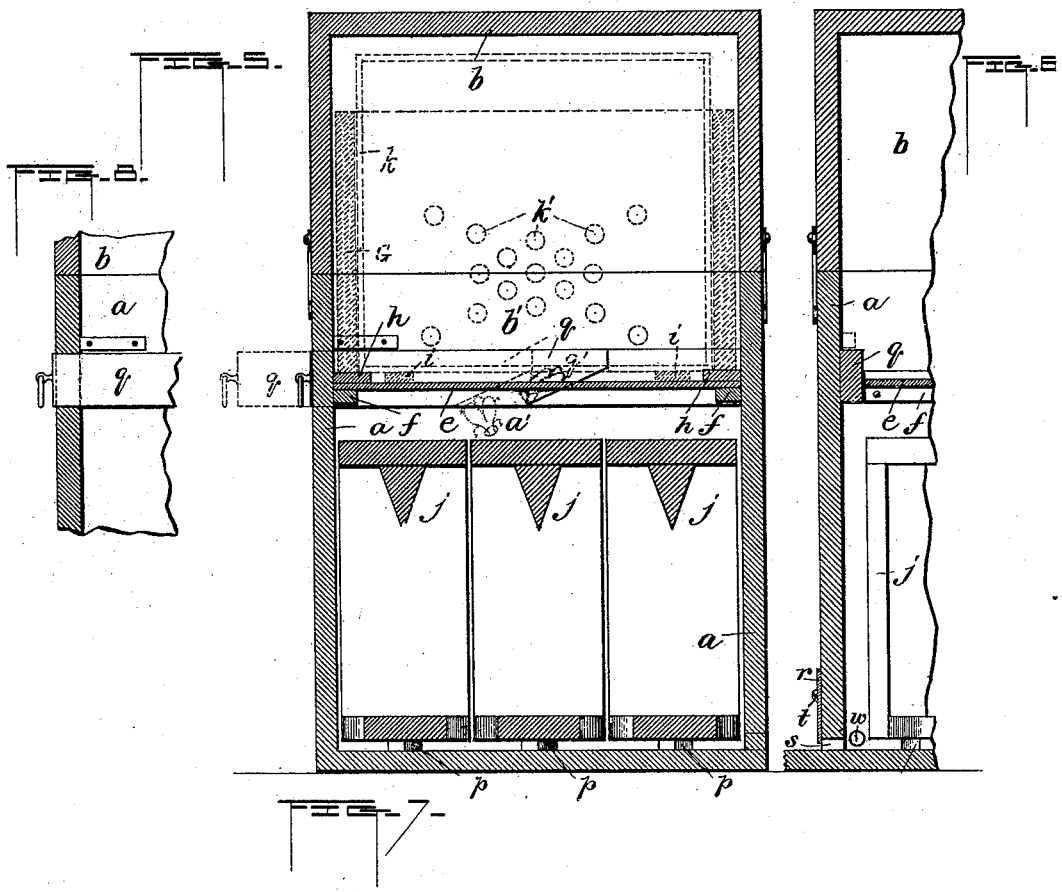
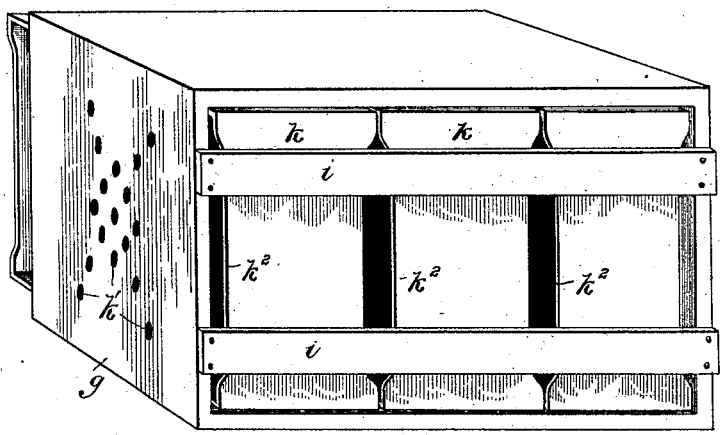
WITNESSES:
INVENTOR,
W. D. Pennock,

# UNITED STATES PATENT OFFICE.

WILLIAM D. PENNOCK, OF DENVER, COLORADO, ASSIGNOR OF ONE-HALF TO DAVID G. PEABODY, OF SAME PLACE.

BEE-HIVE.

SPECIFICATION forming part of Letters Patent No. 425,047, dated April 8, 1890.

Application filed April 24, 1889. Serial No. 308,434. (No model.)

*To all whom it may concern:*

Be it known that I, WILLIAM D. PENNOCK, a citizen of the United States, residing at Denver, in the county of Arapahoe and State of Colorado, have invented certain new and useful Improvements in Bee-Hives; and I do hereby declare the following to be a full, clear, and exact description of the invention, such as will enable others skilled in the art to which it appertains to make and use the same.

My invention relates to those bee-hives in which the upper and lower comb-frames are removable.

The object of my invention is to construct and arrange the comb-frames and the surrounding casing so that a single frame and its contents can be easily removed when desired without injuring the bees or disturbing the remaining combs.

A further object is to arrange the upper and lower compartments in such a manner that the bees may be driven from one into the other by means of smoke, whereby the honey can be removed from the vacated compartment while the bees are safely housed in the other compartment; and a still further object is to provide an adjustable outlet for the bees in order to keep the queen bee in while the worker bees are allowed free access in and out of the hive.

With these ends in view my invention consists in the peculiar features and combinations of parts, more fully described hereinafter, and pointed out in the claims.

Referring to the accompanying drawings, Figure 1 represents a front perspective view of my device, part of the front being cut away to show the interior; Fig. 2, a rear view in perspective, the sliding door to the lower chamber being partially removed; Fig. 3, a detail of the bottom of one of the lower brood racks or comb frames; Fig. 4, a detail view of the removable partition; Fig. 5, a vertical section looking from the rear; and Figs. 6, 7, and 8 detail views. In Fig. 7 the rack $g$ is shown lying upon its side.

The reference-letter $a$ denotes the outer casing or box, which is provided with a removable cover $b$. The hive is divided into two brood-rack sections $a'$ $b'$. These chambers or compartments are separated by a removable partition $e$, which rests upon the beads $f$, secured to the sides of the chamber and located just above the tops of the comb-frames $j$ of the lower compartments. The honey-rack $g$ within the upper compartment rests upon the strips $h$ upon the upper side of the removable partition $e$, and strips $i$, nailed across the bottom of the box, support the comb-frames $k$. The front and rear sides of this rack $g$ are provided with perforations $k'$, while the edges of the comb-frames are recessed at $k^2$, and these, together with the open bottom, enable the bees to have free access in and about the comb-frames and perfect ventilation, which is also essential to their prosperity. Recesses $l$ are made in the upper part of the supporting-strips $h$ on partition $e$ to register with the smoke-orifice $m$ in the rear end of the right-hand wall of the lower section of the hive, as more clearly shown in Figs. 1 and 4. The purpose of this smoke orifice or inlet is to allow smoke to be injected into the upper surplus honey chamber or section $a'$ to drive the bees down into the lower section $b'$, as will presently appear. The back of the lower chamber $b'$ is made accessible by a sliding door $n$, which operates back and forth upon the strips $n'$. This door permits the comb-frames $j$ in the lower chamber to be removed singly without disturbing the adjoining combs. This feature is very desirable, especially when moths attack the combs or when the combs are to be removed for inspection, for it allows the bees in the adjoining frames to remain undisturbed.

To further facilitate the removal of the lower comb-frames and to prevent the bees from becoming injured while a frame is being removed or inserted, the bottom of each comb-frame is provided with a shoe $p$, having sharpened ends like a plow to brush aside the bees while being slid back and forth. The rear vertical bars $z$ of the lower comb-frames $j$ extend below the bottom of the frames a distance equal to the thickness of the shoe $p$, whereby the bottoms of the frames are held up clear of the bottom of the hive to permit the bees to pass under them.

A slide or door $q$ is located in the front part of the hive and normally remains open, as shown in Fig. 1, and the opening left forms a passage $q'$ for the bees between the upper and lower chambers, as shown more clearly in Fig. 5.

$r$ represents an adjustable slide placed over the front entrance $s$. This slide is hung upon screws $t$, located within parallel oblique slots $u$, so that the slide may be raised or lowered by moving it laterally back and forth. Dotted lines represent it in raised adjustment. These oblique bearings or slots $u$ will always keep the lower edge of the slide parallel with the door-sill, so that it can be adjusted to keep the queen bee in, while the smaller bees are allowed free passage back and forth. When the desired adjustment is obtained, the slide can be locked in place by simply screwing the screws up tightly.

Through the lower left-hand corner of the hive a passage $w$ is formed for the purpose of permitting the bees to swarm into another hive. This operation is accomplished by placing an empty hive with a corresponding opening up against the hive containing the bees, so that communication will be formed between the two hives. The entrance-slides are then closed to keep the queens in, and when the old queen enters the new hive many of the bees follow her. The hives are then separated and two colonies thus formed.

The preferred manner of constructing my hive having been set forth, I will now proceed to describe its operation. The bees pass in and out at the front entrance $s$ and work in the upper and lower comb chambers or sections in the usual way. When it is desired to remove the frames from the surplus-honey section, it is important that the bees should not be injured or disturbed, but should be peaceably driven down into the lower chamber while the operation takes place. In order to accomplish this result, smoke is gradually injected into the smoke-inlet $m$, which makes the upper chamber so disagreeable for the bees that they will immediately seek the more congenial climate of the lower chamber via the passage $q'$, which has been previously left open. When the bees have all left the upper chamber, the passage $q'$ is closed to prevent the smoke from entering the lower apartment. The smoke, having a tendency to rise after being injected through the entrance $m$, will preclude the possibility of its descending with the bees to the lower chamber. After the bees have vacated the upper chamber the slide $q$ is closed, as shown in dotted lines, and the top may then be lifted off and the comb-frames removed with perfect safety and freedom and without making the bees cross.

The removal of the comb-frames of the lower section is accomplished by simply withdrawing the sliding door $n$ at the rear of the hive. If a single frame is to be removed, the door is drawn only a short distance, as shown in Fig. 2. When thus partially withdrawn, the frame may be taken out without disturbing the others or stirring up the bees.

Having thus described my invention, what I claim as new, and desire to secure by Letters Patent, is—

1. A bee-hive having the front entrance commanded by a sliding door provided with a pair of parallel oblique slots, in combination with supporting screws or pins passing through the slots, whereby the slide is kept in parallel adjustment with the door-sill, in the manner and for the purpose described.

2. A bee-hive consisting, essentially, of a body portion, a removable partition dividing the body portion into an upper and a lower section, the lower section having cleats upon which the partition rests, and provided with a front bee-entrance and a side smoke-passage, the partition having strips screwed along its upper side edges, each provided with a recess, one of which registers with the smoke-passage, and an adjustable slide carried by the lower section and located between the partition and the front of the hive, whereby a passage-way is formed which may be opened or closed at will between the upper and lower sections, as described.

3. The bee-hive described and shown, consisting, essentially, of a lower portion and a removable upper portion, the lower portion being provided with a front bee-entrance covered by a sliding door having inclined parallel slots, through which pass guiding-screws, a rear opening covered by a sliding door guided upon projecting tracks, cleats secured upon its inner upper sides, a removable partition mounted upon the cleats and leaving a passage-way between it and the hive-wall, and horizontally-sliding comb-frames having upon their lower surfaces the supporting projections described, one of which is tapering at one or both ends, as and for the purpose set forth.

In testimony whereof I affix my signature in presence of two witnesses.

WILLIAM D. PENNOCK.

Witnesses:
CHARLES T. KLANN,
JNO. W. KING.